July 10, 1962   J. A. HULL ETAL   3,044,068
MEANS FOR AND METHOD OF RECORDING TIME MARKERS
Filed April 27, 1959
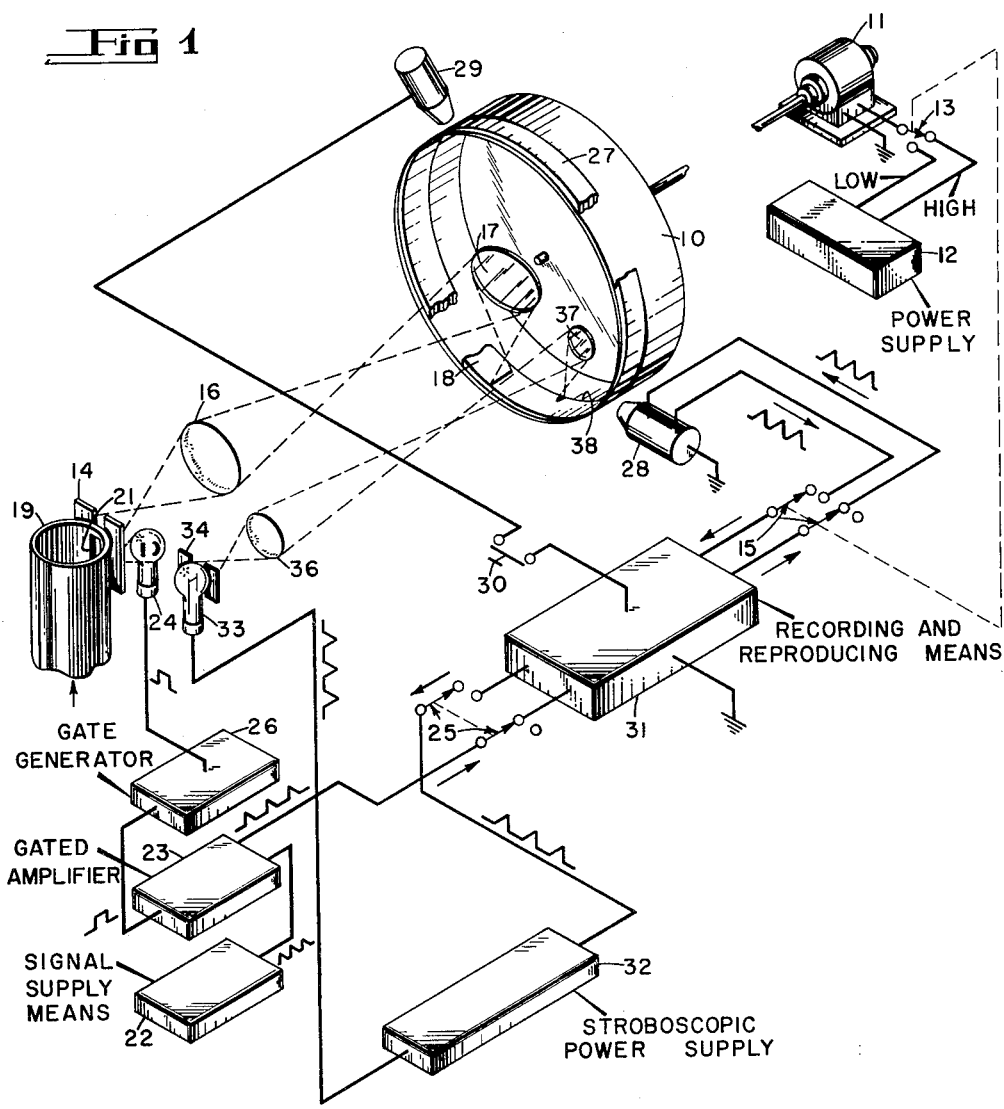
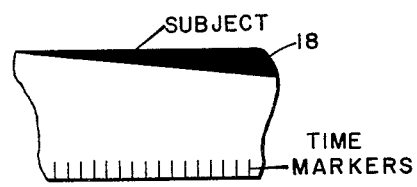
JOSEPH A. HULL
ROBERT N. HOTCHKISS
INVENTORS
BY Alden D. Redfield
Abraham Ogman
ATTORNEYS

United States Patent Office 3,044,068
Patented July 10, 1962

3,044,068
MEANS FOR AND METHOD OF RECORDING TIME MARKERS
Joseph A. Hull, Danvers, Mass., and Robert N. Hotchkiss, Hicksville, N.Y., assignors to Avco Corporation, a corporation of Delaware
Filed Apr. 27, 1959, Ser. No. 808,962
15 Claims. (Cl. 346—1)

This invention relates to an apparatus for providing time markers on film. In particular, this invention relates to recording time markers, occurring at an extremely high repetition rate on film. The recording means, referred to hereinafter as a time marker generator, cooperates with a camera means for recording time markers on the film carried in the camera.

The principal difficulty with recording high frequency time markers on film stems from the short duration of the time marker signals. Where it is desired to record 10 microsecond intervals on film the time markers, if they are to provide adequate definition, will not exceed 2 microseconds in duration. To properly expose film in this short interval requires an extremely high intensity light source which is capable of being energized to full brightness in an extremely short time. There is no known commercial light source which can satisfy this requirement.

In the past, time markers have been inserted on film after the film has been processed. A length of film is accurately subdivided and time markers inserted on each of these subdivisions. While this technique is suitable for ordinary applications, it is completely inadequate where one requires extremely high accuracy. The principal shortcoming lies in the distortion that the film undergoes while being developed and processed. It is extremely difficult to predict the amount of shrinkage or elongation which the film undergoes during processing. Another important consideration is the possibility that an error made in one or more time markers inserted on the film, after it has been processed, will be carried through in the remaining time markers. Furthermore, there is no assurance that the film footage can be exposed linearly.

It is an object of the present invention, to provide means for and method of recording time markers on the film in synchronism with its exposure, and before the film is processed, to secure accurate time markers. Any variations in the length of the film during its processing will vary the time markers inscribed thereon to the same degree as the subject photographed. Furthermore, the accuracy of the time markers is not affected by a nonlinear exposure of the film.

It is another object of the invention to provide a means for and a method of recording time markers occurring at a high repetition rate on film.

It is another object of the invention to provide a time marker generator which stores time markers while the film is being exposed to a subject, and subsequently uses the stored signals to record time markers on the film.

It is a further object of the invention to provide a time marker generator which makes it possible to place repeatedly occurring time markers on film through the use of conventional, and easily obtainable light sources.

It is also an object of the invention to provide a time marker generator which:

(1) Provides means for synchronizing the time marker with each subject exposure.

(2) Provides a fixed permanent spatial relationship between the time markers and the subject photographed to secure an accurate time base.

(3) Utilizes a magnetic medium for storing time marker signals when film is being exposed to a subject, and then subsequently uses the stored signals for re-exposing the film for placing time markers thereon.

(4) Is particularly suited for use with a rotating drum camera, wherein the entire film is exposed in an extremely short interval of time.

The time marker generator for recording time markers on film normally cooperates with an exposure means for exposing the film, and film carrier for moving the film to and from the exposure means. A signal supply means, adapted to be energized at the start of the exposure period, is provided for supplying time marker signals to a magnetic storage medium which is maintained in a fixed spatial relationship with the photographic film. At the conclusion of the subject exposure interval, the stored time marker signals are reproduced from the magnetic storage medium and coupled to a light source. The light source is energized by each of the reproduced time marker signals. The light produced is focused on the film and momentarily re-exposes the film and records time markers on the film.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings in which:

FIGURE 1 illustrates, in diagrammatic form, a preferred embodiment of a time marker generator embodying the principles of the present invention.

FIGURE 2 is an enlarged representation of a portion of film showing a subject and time markers.

Referring to FIGURE 1, the preferred embodiment of the time marker generator is shown in conjunction with a rotating drum camera. This medium was selected because the film is carried to and from an exposure medium at high speed, at approximately 7,500 inches per second. In this connection, time markers occurring at a minimum rate of 100,000 per second, or one for every 10 microseconds, were required for accurate time measurement of the events photographed by the camera. The rotating drum camera by no means represents the only environment in which the time marker generator can operate. The time marker generator is adapted to function with film moving at any rate of speed, but is particularly useful in applications which require extraordinarily high film movement speeds.

Referring to FIGURE 1 of the drawing, the elements of the rotating drum camera shown therein comprise a rotating drum 10 actuated by a motor 11. For reasons to become apparent hereinafter, the motor 11 is supplied from a power supply 12 which is designed to rotate the drum 10 at a high and a much lower speed. The speed selection is made through a switch 13 shown connected to the power supply 12 for high speed operation.

The exposure means of the rotating drum camera is represented by a slotted aperture 14, an objective, or focusing, lens 16, and a mirror 17. The mirror 17 reflects the light coming from the lens 16 to a ring of photographic film 18 mounted on the inside circumference of the drum 10. For purposes of this discussion, the subject to be photographed is a light source which travels up through a cylinder 19 in a direction indicated by the arrow. The cylinder 19 includes a slot 21 which permits the light to pass from the cylinder 19 through the aperture 14, to the lens 16, to the mirror 17 and finally to the film 18. That the subject to be photographed may also be an illuminated physical object as is conventional, is manifest.

The time marker generator for recording time markers on the film 18 comprises a signal supply means 22 for supplying time marker signals. The time marker signals preferably constitute a pulse train in which the signals occur periodically. In this instance, the signal supply means 22 is continuously activated and may comprise any suitable pulse generator, a free running multivibrator, for example. It supplies time marker signals to a gated amplifier 23. The gated amplifier 23 is conventional in design and acts to prevent the further translation of the time marker signals in the absence of an enabling gate. The enabling gate is provided by means of a photoelectric cell 24 and a gate generator 26. The photoelectric cell 24 responds to the presence of light passing through the aperture 14 to develop an electrical signal. This signal is applied to the gate generator 26 wherein in a conventional operation it is differentiated to provide a narrow trigger signal at its leading edge. The trigger signal actuates the gate generator 26 causing it to develop a gate signal which, when applied to the gated amplifier 23 permits the time marked signals from the signal supply means 22 to pass through the gated amplifier 23 to a switch 25.

The time marker generator also includes a storage means synchronized with the film movement for storing time marker signals. The storage means comprises a storage medium secured to the drum 10 in a fixed spatial relationship with the film 18. In FIGURE 1, the storage medium is represented by a magnetic film ring 27 shown secured to the outer circumference of the drum 10. The magnetic film 27 is rotated with the drum so that there is no relative movement between the magnetic film 27 and the photographic film 18. The storage medium also includes a recording and reproducing transducer 28 which is conventional in construction and design and responds to electrical signals in one instance, to store these signals in the magnetic film 27, and in another instance responds to the stored signals to reproduce them as electrical signals. Also associated with the magnetic film 27 is an erasing transducer 29 which, when energized by depressing a push button switch 30, erases the signals stored in the magnetic film. It will be obvious to one skilled in the art that an electrostatic or other suitable storage medium may be substituted for the magnetic medium.

Finally, the time marker generator includes means responsive to the stored marker signals in the magnetic film 27 for re-exposing the photographic film 18 in synchronism with the stored marker signals whereby time markers are recorded on the film 18. This means comprises a recording and reproducing means 31 coupled through a switch 15 to tranducer 28, and a power supply 32 coupled between the recording and reproducing means 31 and a light source 33. Switch 15 is ganged to switch 13 for simultaneous operation. A switch 25 connects the power supply 32 and the gated amplifier 23 to the recording and reproducing means 31. The power supply 32 comprises a conventional stroboscopic power supply adapted to energize a light source for a short period, when actuated. Associated with the light source 33 is a second exposure medium comprising a slotted aperture 34, an objective or focusing lens 36 and a mirror 37. The second exposure means operates substantially in the same way as the exposure means for the subject being photographed, but when activated it exposes a small region of the photographic film adjacent to the inner marginal edge 38, as indicated in FIGURE 1.

To record time markers on the rapidly moving film carried by the rotating drum camera, it is proposed, first to expose the film to the subject, and simultaneously during the subject exposure period to store time marker signals in the storage medium. Since, in accordance with the invention, the storage medium is in a fixed spatial relationship with the film, the time markers stored thereon will be in a fixed spatial relationship with the subject photographed by the film. As heretofore explained, it is virtually impossible to simultaneously expose the film to the subject and to the time markers. To do so, would require an extremely high intensity short-duration light source, and a light source of this type is not available.

After the film has been exposed to the subject, the drum speed is reduced considerably, by a factor of 100 or 1000 to 1. At the reduced speed, the reproducing apparatus is actuated to reproduce the stored signals at a substantially reduced repetition rate and to actuate stroboscopic power supply 32. The stroboscopic power supply 32, in turn, energizes light source 33 in synchronism with the occurrence of each reproduced time marker signal. Since the film is travelling at a considerably reduced rate, in the order of 75 or 7.5 inches per second respectively, the time marker signals are reproduced at a substantially reduced rate and, it is a simple matter to expose the film for the duration of the reproduced time marker signals using an off-the-shelf photographic light source and implementing equipment.

The FIGURE 1 embodiment operates as follows. Initially the several switches are connected as indicated in FIGURE 1. The signal supply means 22 is activated and produces time marker signals. At some indefinite time, a quantity of light passes up through cylinder 19 and reaches the aperture 21. A portion of the light escapes through aperture 21 and the slotted aperture 14 and exposes the film 18 through the lens 16 and the mirror 17. Another portion of this light impinges on the photoelectric cell 24, thereby developing an electrical signal therein. This electrical signal passes from the photoelectric cell 24 to the gate generator 26 which responds by generating a gate signal. The gate signal is then applied to the gated amplifier 23 thus enabling the time marker signals, coupled to the gated amplifier from the signal supply means 22, to pass through the gated amplifier 23 and the switch 25 to the recording and reproducing means 31, where the time marker signals are amplified and translated through the switch 15 to the recording and reproducing transducer 28. The magnetic field created by each of the time marker signals in the transducer 28 magnetizes a segment of the magnetic film 27, thereby storing a representation of the time marker signal therein. The above described recording operation is repeated for each time marker signal applied to the transducer 28. It is well to point out that at this time the drum is being rotated at its normal rate of speed at approximately 7,500 inches per second. As the light in the cylinder 19 passes out of reach of the aperture 21 the signal generated in the photoelectric cell 24 drops to zero. The drop in voltage terminates the gate generated in the gate generator 26 thereby cutting off the supply of time marker signals to the recording and reproducing means 31 and the transducer 28.

As a result of the foregoing operation, time marker signals have been stored in the magnetic film 27 in a fixed spatial relationship with the photographic film 18. This fixed spatial relationship remains constant as long as no attempt is made to remove the photographic film 18.

After the photographic film 18 has been exposed to the subject the switches 13 and 15 are moved from the positions indicated in FIGURE 1 to the alternative positions. The effect of this action is to connect the motor 11 to the low speed output of the power supply 12 thereby reducing the speed of the rotating drum. The transducer 28 is now connected to the reproducing channel of the recording and reproducing apparatus 31 but as yet the stroboscope power supply 32 is not connected to the output of the recording and reproducing means 31. When the drum has attained a reduced speed switch 25 is moved to connect the power supply 32, and disconnect the gated amplifier, from the recording and reproducing means 31. When a stored time marker signal passes beneath the transducer 28 there is induced in the transducer, in a conventional manner, an electrical signal which is representative of the stored time marker signal. This electrical signal is amplified in the recording and reproducing means 31 and coupled to the power supply 32. The latter is triggered by the reproduced time marker signals and supplies a short burst of power, about equal in duration to the duration of the reproduced time marker signal, to the light source 33, energizing it. Light from the source passes through the slotted aperture 34, the lens 36, to the mirror 37, where its direction is changed. The reflected light is then focused on the photographic film 18 exposing it for a short instant of time whereby a time marker is recorded thereon. The aforementioned exposure operation is repeated for each stored time marker signal. Since there is a fixed spatial relationship between the magnetic film 27 and the photographic film 18, there is no need to cut off the reproducing process after a single rotation of the drum. Repeated exposures, due to the reproducing operation, will occur at precisely the same point. A typical result is shown in FIGURE 2.

If it is desired to remove the time marker signals from the magnetic film it is merely necessary to depress the push button 30. This action energizes the erase transducer 29 which acts to remove the information stored in the magnetic film 27.

One feature of the preferred embodiment is that the time marker intervals may be changed by merely changing their repetition rate when they are generated in the signal supply means 22. It will be noted that the time markers are recorded on the photographic film before the film is removed from the drum and processed. Any subsequent variations in the length of the film will affect both the subject photographed and the recorded time markers the same way, so that their relationship will remain fixed at all times. It will also be noted that the described system can be set up in a simple manner to perform an unconventional and a heretofore impractical operation using conventional off-the-shelf commercial items.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

1. A time marker generator for recording time markers on film adapted to move relative to an exposure medium comprising: means for moving the film at a high and a low speed, the high speed being used to expose the film to a subject; means for providing time marker signals; recording and reproducing means time synchronized with the film movement for storing time marker signals during the exposure of the film to the subject and for subsequently reproducing said time marker signals; and exposure means operative at the low speed and momentarily triggered by the reproduced time marker signals for re-exposing the film whereby the time markers are recorded on the film.

2. A time marker generator as described in claim 1 which in addition, includes means for erasing the stored time marker signals.

3. A time marker generator as described in claim 1 in which said synchronized storage means comprises a magnetic storage means for recording and reproducing the time marker signals, and said triggered exposure means comprises a light source actuated by the reproduced time marker signals.

4. In combination with a camera including a movable film carrier and an exposure means for exposing the film to a subject, a time marker generator for recording time markers on the film comprising: storage means adapted to operate in synchronism with the film carrier; signal supply means for supplying time marker signals to said storage means for storage therein when the film is being exposed to the subject; and means triggered by the stored time marker signals for re-exposing the film and recording time markers on the film.

5. In a rotating drum camera having an exposure means, a rotating drum for carrying film to and from the exposure means for exposing the film to a subject, a time marker generator for recording time markers on the film comprising: a signal supply means for supplying time marker signals; a storage means synchronized with the film movement for storing the time marker signals; means coupled to the exposure means and said signal supply means for translating time marker signals to said storage means when the film is being exposed to the subject; and means responsive to the stored time marker signals for re-exposing the film in synchronism with the stored time marker signals whereby time markers are recorded on the film.

6. In a rotating drum camera having an exposure means, a rotating drum for carrying film to and from the exposure means for exposing the film to a subject, a time marker generator for recording time markers on the film comprising: a signal supply means for supplying time marker signals; a storage medium secured to the drum in a fixed spatial relationship to the film; means for recording time marker signals in the storage medium; means coupled to signal supply means for translating the time marker signals to said recording means when the film is being exposed to the subject for storing the time marker signals in said storage medium; means for reproducing the stored time marker signals from the storage medium; and means responsive to the reproduced time marker signals for momentarily re-exposing the film with each occurrence of a reproduced time marker signal.

7. In combination with a rotating drum camera having an exposure means, a cylindrical drum for carrying film to and from the exposure means, and actuating means for rotating the drum, a time marker generator for recording time markers on the film comprising: a magnetic storage means associated with the drum, said magnetic storage means being in a fixed spatial relationship to the film; a recording transducer adapted for storing signals in said storage means when energized; a signal supply means for applying time marker signals to said recording transducer when the film is exposed for energizing said recording transducer and storing the time marker signals in the magnetic storage means; a reproducing transducer adapted to be energized by the time marker signals stored in said magnetic storage means; control means operatively connected to the actuating means and said reproducing transducer for switching the time marker generator to reproduce the stored time marker signals at a repetition rate substantially lower than that at which they were stored; and second exposure means comprise a power supply coupled to a light source, said power supply being repeatedly actuated by reproduced time marker signals for momentarily energizing the light source and re-exposing the film.

8. A time marker generator as described in claim 7 in which said storage means comprises a film of magnetic material secured to said drum.

9. A time marker generator for recording time markers on film adapted to be exposed to a subject comprising: means for storing time marker signals said storage means being time synchronized with said film for maintaining a synchronized relationship between the stored time marker signals and the subject image on the exposed film; signal supply means for supplying time marker signals to said storage means as the film is exposed; means for reproducing the stored time marker signals at a repetition rate substantially lower than that at which they were stored; and exposure means adapted to be momentarily activated by the stored time marker signals for re-exposing the film whereby the time markers are recorded on film.

10. A method of recording time markers on film comprising: exposing the film to a subject; developing and storing time marker signals in a storage medium as the film is being exposed; maintaining a synchronized relationship between the stored time marker signals and the subject image on the exposed film; reproducing the stored time marker signals at a substantially lower repetition rate than that at which they were stored; activating an exposure means with each reproduced time marker signal for re-exposing the film.

11. A method of recording time markers on film comprising: generating time marker signals; exposing the film to a subject; translating the time marker signals to a storage medium as the film is exposed and storing them therein; maintaining the storage medium and the film in a fixed spatial relationship for maintaining a time synchronism between the stored time marker signals, and the subject image on the exposed film; reproducing the stored time marker signals at a substantially reduced repetition rate than that at which they were stored; and activating an exposure means with each reproduced time marker signal for re-exposing the film.

12. A method of recording time markers on film comprising: generating time marker signals; exposing the film to a subject; converting the time marker signals to magnetic flux fields as the film is exposed for storing the time marker signals in a magnetic storage medium; maintaining a synchronized relationship between the magnetic storage medium and the subject image on the exposed film; reproducing the stored time marker signals; activating a power supply with each reproduced time marker signal for substantially the duration thereof; applying the power supply output to a light source for energizing it; and directing the light output of the light source to the film re-exposing it.

13. A method of recording time markers on film comprising: generating time marker signals; exposing the film to a subject; actuating a translating means for translating the time marker signals to a storage medium for storing time marker signals therein as the film is exposed and establishing a time relationship between the stored time marker signals and the subject image on the exposed film; deactivating the translating means after the film has been exposed; reproducing the stored time marker signals while maintaining the aforementioned time relationship; and actuating an exposure means with each reproduced time marker signal for re-exposing the film.

14. A method of recording time markers on film as described in claim 13 in which the last mentioned step comprises actuating a power supply for energizing a light source, the light output of which is applied to the film.

15. A time marker generator for recording time markers on film adapted to be exposed to a subject comprising: means for moving said film relative to a subject for exposing said film; means for providing time marker signals; storage and reproducing means for storing the time marker signals and subsequently reproducing them, said storage and reproducing means being time synchronized with said exposed film, and exposure means adapted to be momentarily activated by the reproduced time marker signals for re-exposing said exposed film whereby the time markers are recorded on the film.

References Cited in the file of this patent
UNITED STATES PATENTS

| | | |
|---|---|---|
| 2,458,882 | Stoner et al. | Jan. 11, 1949 |
| 2,746,833 | Jackson | May 22, 1956 |
| 2,800,831 | Keiser et al. | July 30, 1957 |
| 2,803,515 | Begun et al. | Aug. 20, 1957 |
| 2,803,809 | Tilley | Aug. 20, 1957 |
| 2,857,567 | Jokosky | Oct. 21, 1958 |
| 2,871,465 | Nielsen | Jan. 27, 1959 |